(12) United States Patent
De Baere et al.

(10) Patent No.: US 11,160,215 B2
(45) Date of Patent: Nov. 2, 2021

(54) BALE WRAPPING ASSEMBLY FOR A ROUND BALER

(71) Applicant: CNH Industrial America LLC, New Holland, PA (US)

(72) Inventors: Freek De Baere, Maldegem (BE); Michael Van Giel, Asper (BE)

( * ) Notice: Subject to any disclaimer, the term of this patent is extended or adjusted under 35 U.S.C. 154(b) by 1233 days.

(21) Appl. No.: 14/861,512

(22) Filed: Sep. 22, 2015

(65) Prior Publication Data

US 2016/0088797 A1 Mar. 31, 2016

(30) Foreign Application Priority Data

Sep. 26, 2014 (BE) .................................. 2014/0739

(51) Int. Cl.
*A01F 15/07* (2006.01)
*A01F 15/14* (2006.01)
*B65B 11/04* (2006.01)

(52) U.S. Cl.
CPC ........ *A01F 15/0715* (2013.01); *A01F 15/141* (2013.01); *B65B 11/04* (2013.01); *A01F 2015/0745* (2013.01)

(58) Field of Classification Search
CPC ................ A01F 15/141; A01F 15/0715; A01F 2015/0745; B65B 11/04
USPC ........... 100/2, 5, 8, 13, 88; 53/399, 582, 587
See application file for complete search history.

(56) References Cited

U.S. PATENT DOCUMENTS

| | | | |
|---|---|---|---|
| 4,619,106 A | 10/1986 | Van Der Lely | |
| 5,941,166 A * | 8/1999 | Geiser | A01F 15/141 100/13 |
| 5,950,530 A * | 9/1999 | Clauss | A01F 15/141 100/13 |
| 6,021,622 A * | 2/2000 | Underhill | A01F 15/0715 53/118 |
| 6,035,773 A | 3/2000 | Rempe | |
| 6,209,450 B1 * | 4/2001 | Naaktgeboren | A01F 15/141 100/4 |
| 6,237,478 B1 | 5/2001 | Carteret et al. | |
| 8,333,146 B2 | 12/2012 | Smith | |
| 2001/0018821 A1 * | 9/2001 | Chow | A01F 15/141 53/589 |
| 2006/0242931 A1 * | 11/2006 | Ryse | A01F 15/0715 53/587 |
| 2008/0034984 A1 | 2/2008 | Olander et al. | |

(Continued)

FOREIGN PATENT DOCUMENTS

| | | | | |
|---|---|---|---|---|
| EP | 0535532 A2 * | 4/1993 | .......... | A01F 15/141 |
| EP | 0535532 A2 | 4/1993 | | |

(Continued)

OTHER PUBLICATIONS

English translate (EP0535532A2), retrieved date Mar. 25, 2020.*

*Primary Examiner* — Adam J Eiseman
*Assistant Examiner* — Mohammed S. Alawadi
(74) *Attorney, Agent, or Firm* — Patrick Sheldrake; Peter Zacharias

(57) ABSTRACT

The bale wrapping assembly for a round baler includes at least one twine inserter coupled to a drive. The drive is configured to drive the at least one twine inserter along a movement trajectory to intermittently introduce one or more twines into an outer circumferential surface of a completed bale. The one or more twines are positioned at the at least one twine inserter.

13 Claims, 3 Drawing Sheets

(56) References Cited

U.S. PATENT DOCUMENTS

2010/0192516 A1* 8/2010 Olander .............. A01F 15/0715
53/399
2016/0113204 A1* 4/2016 Rosseel .............. A01F 15/0715
53/167

FOREIGN PATENT DOCUMENTS

EP        1179295 A1    2/2002
EP        1346627 A1    9/2003

* cited by examiner

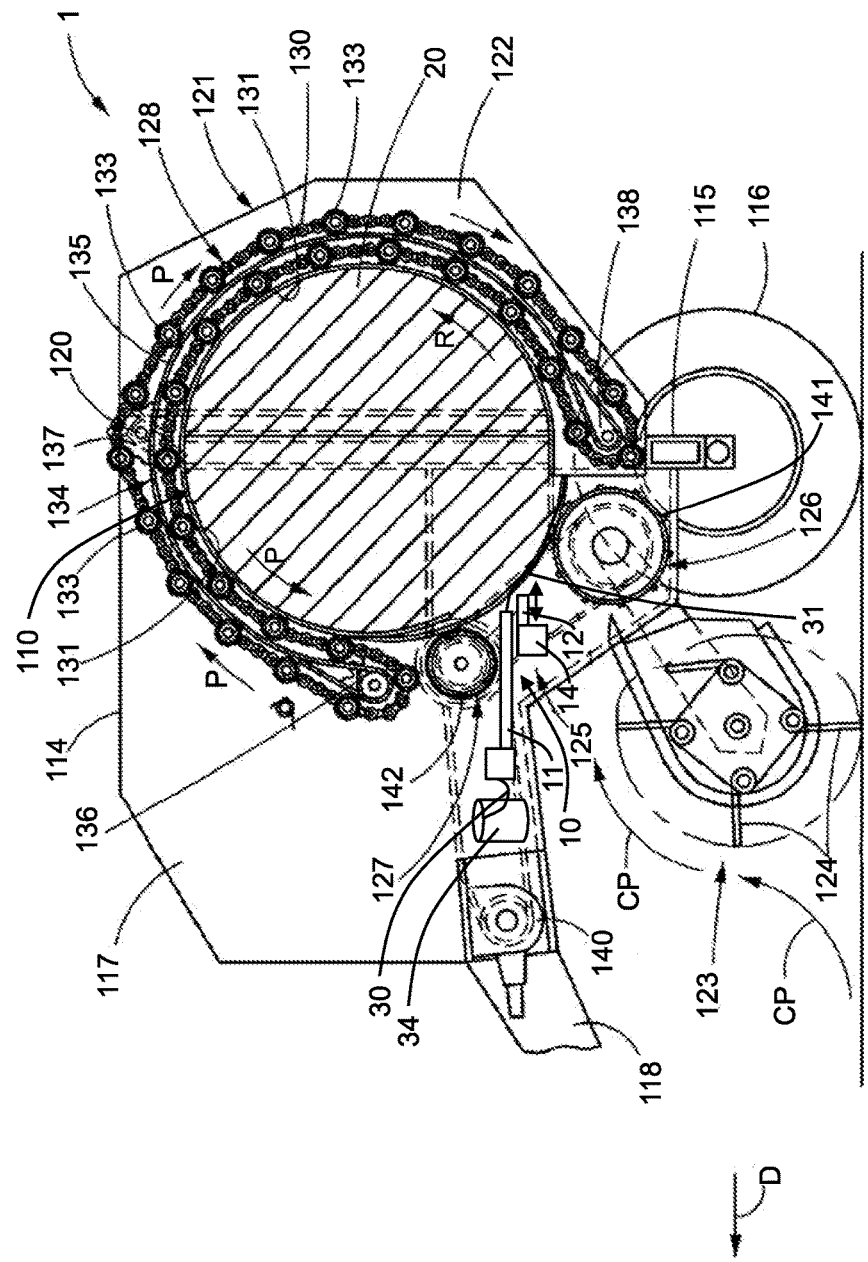
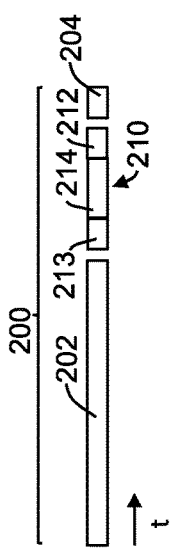
Fig 1
Fig 2

BALE WRAPPING ASSEMBLY FOR A ROUND BALER

This application claims priority to Belgium Application BE2014/0739 filed Sep. 26, 2014, which is incorporated herein by reference in its entirety.

FIELD OF THE INVENTION

The invention concerns a bale wrapping assembly for a round baler and a method of operating a bale wrapping assembly. More particularly a bale wrapping assembly for a round baler of the type that wraps twine around a completed bale during a wrapping operation.

BACKGROUND OF THE INVENTION

It is generally known to execute a bale wrapping operation after a completed bale has been formed in the bale forming chamber of a round baler. During such a wrapping operation a suitable wrapping material is applied to the outer circumferential surface of the completed bale. Such wrapping material could for example be a suitable net, a suitable plastic layer, one or more twines, etc. The invention concerns a bale wrapping assembly suitable for applying twines during such a wrapping operation to the outer circumferential surface of a round bale.

Several such bale wrapping assemblies are for example known from U.S. Pat. No. 8,333,146, EP0978231, US2008/0034984, U.S. Pat. No. 6,035,773, etc. in which often a plurality of twines are applied to the outer circumferential surface of the completed bale in accordance with a desired wrapping pattern. Conventionally this is accomplished by suitably positioning one or a plurality of twine arms or tubes along the width direction of the completed bale and moving it between two outer positions, by means of suitable drives under control of a suitably programmed controller combined with a corresponding rotary movement of the completed bale in the bale forming chamber. At the end of the wrapping operation the twines are severed from their twine source and the wrapped completed bale is ejected from the bale forming chamber.

One particular problem with these known bale wrapping assemblies is the difficulty to efficiently and reliably attach the final lengths of the twines to the completed bale, such that they are not causing problems during subsequent handling operations when a certain length of twine is no longer engaged with the outer circumferential surface of the completed bale. These detached lengths of twine, can become entangled with or stuck below handling equipment such as for example suitable lifting equipment for lifting the bales from the field onto a loading cart for further transport.

In search for a solution to this problem, there have been proposed several bale wrapping assemblies that provide means for creating a suitable groove into the outer circumferential surface of the completed bale into which the final ends of twine can be subsequently introduced during the wrapping operation.

EP1346627 shows a system that creates a groove near the center of the width of the bale by means of a suitably positioned roller that also functions to push the final lengths of twine into this groove.

EP0858734 shows a knife assembly that creates a groove into the outer circumferential surface of the completed bale upstream, with respect to the direction of rotation of the bale, from the location of where the final lengths of twine are dispensed on the outer circumferential surface of the bale.

EP0980646 shows a rotating cutter that creates a groove into the outer circumferential surface of the completed bale upstream, with respect to the direction of rotation of the bale, from the location of where the final lengths of twine are dispensed on the outer circumferential surface of the bale. The rotating cutter comprising two star-shaped discs that also function as a guide for the twine.

A problem with such systems is that they affect the consistency of the bale as the means that create a groove do this into the entire circumference of the bale, some systems even create such groove not only in the outer circumferential surface of the completed bale, but in all crop layers during the bale forming process still further aggravating this problem. Additionally when the final lengths of twine are successfully introduced into this groove during the wrapping operation, this facilitates the subsequent handling operations, but provides for a new problem during subsequent feeding operations in which the bales are provided to animals as fodder. The lengths of twine inserted in these grooves are often no longer easily visible which increases the risk that lengths of twine inserted in these grooves will remain undetected during removal of the twine around the bale in preparation of a feeding operation. Such undetected twines present amongst the crop serving as fodder can pose a health risk for the animals.

Therefor there still exists a need for an improved bale wrapping assembly and a corresponding method of operation that overcomes the above mentioned problems and provides for a way to reliably secure the final lengths of twine to the outer circumferential surface of the bale with a reduced impact on the consistency of the bale and a reduced risk of undetected lengths of twine.

SUMMARY OF THE INVENTION

According to a first aspect of the invention there is provided a method of operating a bale wrapping assembly for a round baler, wherein the bale wrapping assembly during at least a part of a wrapping operation intermittently introduces one or more twines into an outer circumferential surface of a completed bale.

In this way the twine is reliably secured to the outer circumferential surface of the bale as it is intermittently introduced into the completed bale thereby increasing frictional forces acting on the twine. This is realized in a way that reduces impact on the consistency of the bale and has a reduced risk of undetected lengths of twine as no longer a continuous groove is created that impacts the consistency of the bale and the twine is only intermittently introduced in to the bale whereby it remains visibly detectable more easily.

According to an embodiment the wrapping operation of a completed bale comprises one or more wrap phases during which wraps of the one or more twines are wrapped around the outer circumferential surface of the completed bale; and wherein the bale wrapping assembly during at least one of said wrap phases intermittently introduces the wraps into the outer circumferential surface of the completed bale.

In this way the method can be flexibly applied to the wrap phases to which an increased bale engagement of the twine is beneficial, while not affecting the twine or the completed bale during other wrap phases.

According to a further embodiment the wrapping operation comprises one or more of the following:

an end wrap phase during which end wraps are applied, said end wraps comprising the final wraps of the one or more twines;

an initial wrap phase during which initial wraps are applied, said initial wraps comprising the first wraps of the one or more twines.

In this way, the length of these wrap phases and the corresponding length of twine used can be minimized without affecting the reliability of engagement with the completed bale.

According to a further embodiment the wrapping operation of a completed bale, during which the one or more twines are wrapped around the outer circumferential surface of the completed bale, comprises an end wrap phase during which end wraps, comprising the final share of the length of the one or more twines wrapped around the outer circumferential surface of the completed bale, are applied; and wherein the bale wrapping assembly intermittently introduces the one or more twines into the outer circumferential surface of the completed bale during this end wrap phase.

In this way the end wraps, which are the part of the twines most sensitive to subsequent release during handling operations, are reliably secured.

According to a preferred embodiment the bale wrapping assembly only intermittently introduces the one or more twines into the outer circumferential surface of the completed bale during this end wrap phase.

In this way the end wraps which are most sensitive to subsequent release are reliably secured with a minimal impact on the rest of the wrapping operation.

According to a further embodiment, during at least one of the one or more wrap phases, for example the end wrap phase, the one or more wraps are wrapped around a predetermined circumferential wrap zone, for example the end wrap zone, of the outer circumferential surface of the completed bale; and wherein the bale wrapping assembly intermittently introduces the one or more wraps into the outer circumferential surface of the completed bale when present in this predetermined circumferential wrap zone.

In this way a minimal impact on the consistency of the completed bale is achieved as only the wrap zone, for example the end wrap zone, is affected by operations intermittently piercing the outer circumferential surface.

According to a further embodiment the width of said predetermined circumferential end wrap zone is smaller than 5% or the width of the circumferential surface of the completed bale, preferably smaller than 3%.

In this way the area of the circumferential surface that is impacted by operations intermittently piercing the outer circumferential surface remains limited.

According to a further embodiment, the bale wrapping assembly intermittently introduces the one or more twines into the outer circumferential surface of a completed bale during a plurality of twine introduction cycles, each twine introduction cycle comprising:

an insertion phase during which the one or more twines are introduced into the outer circumferential surface of the completed bale by the bale wrapping assembly; and a surface phase during which the one or more twines are not introduced into the outer circumferential surface of the completed bale by the bale wrapping assembly.

In this way the insertion phase assures a sufficiently reliable connection of the twine with the bale, while the surface phase ensures sufficient detectability of the twine and minimal impact on the consistency of the bale.

Preferably the ratio of the distance of circumferential surface covered by the one or more twines during the surface phase with respect to the distance covered during the introduction cycle is larger than 50%, preferably larger than 80%.

In this way detectability of the twine is maximized while the impact on the consistency of the bale is minimized According to a second aspect of the invention, there is provided a bale wrapping assembly for a round baler, wherein the bale wrapping assembly comprises one or more twine inserters, each coupled to a drive configured such that it drives the twine inserter along a movement trajectory to intermittently introduce one or more of the twines, which are positioned at the twine inserter, into an outer circumferential surface of the completed bale.

In this way a simple and effective implementation is provided in which the twine is reliably secured to the outer circumferential surface of the bale, in a way that reduces impact on the consistency of the bale and reduces the risk of undetected lengths of twine as no longer a continuous groove is created that impacts the consistency of the bale and the twine is only intermittently introduced in to the bale whereby it remains visibly detectable more easily.

According to an embodiment the drive is configured to drive the twine inserter such that the movement trajectory intersects with the outer circumferential surface of the completed bale, the movement trajectory comprising:

an extracted trajectory portion during which the twine inserter is positioned by the drive, outwardly of the outer circumferential surface of the completed bale, at a radial distance that allows for one or more of the twines to be positioned in between the twine inserter and the outer circumferential surface; and an inserted trajectory portion during which the twine inserter is positioned by the drive inwardly through the outer circumferential surface into the completed bale, thereby inserting one or more of the twines, that were positioned in between the twine inserter and the outer circumferential surface in the extracted trajectory portion, a radial insertion distance from the outer circumferential surface into the completed bale at the location of the twine inserter.

In this way the inserted trajectory portion assures a sufficiently reliable connection of the twine with the bale, while the extracted trajectory portion ensures sufficient detectability of the twine and minimal impact on the consistency of the bale.

According to a further embodiment the drive is further configured to modify the frequency with which the twine inserter cycles through the movement trajectory and/or the ratio of the inserted trajectory portion versus the extracted trajectory portion, taking into account the rotational speed of the outer circumferential surface of the completed bale, in order to adjust the distance of the circumferential surface covered by the one or more twines during respectively the inserted trajectory portion and the extracted trajectory portion and/or the ratio of these respective distances.

In this way the desired twine introduction cycle can be easily adjusted, for example to take into account variations in crop parameters, bale parameters or other harvesting parameters.

According to a further embodiment the drive is configured to eccentrically rotate the twine inserter around an axis of rotation parallel to the axis of rotation of the completed bale, thereby providing a circular movement trajectory.

In this way a particularly simple and robust drive is provided for imparting a suitable movement trajectory to the twine inserter.

According to a further embodiment the distance from the twine inserter to the axis of rotation, which forms the radius of the circular movement trajectory, is larger than the distance from the outer circumferential surface of the completed bale to the axis of rotation.

In this way a particularly simple and robust arrangement of the movement trajectory can be chosen which ensures an inserted and an extracted trajectory portion.

According to a further embodiment the outer circumferential surface of the completed bale divides the circular movement trajectory in a first circle segment protruding into the completed bale and a second circle segment extending out of the completed bale, the first circle segment thereby forming the inserted trajectory portion and the second circle segment thereby forming the extracted trajectory portion.

In this way the inserted and extracted trajectory portion are realized in a simple and effective way.

According to a further embodiment the drive comprises a bale engager configured to contact the outer circumferential surface of the completed bale such that the rotary motion of the drive around the axis of rotation is imparted by the rotary motion of the completed bale.

In this way no dedicated drive coupling must be provided for the drive, as rotary motion is provided from the completed bale itself, which simplifies for example retrofitting this system to an existing bale wrapping system.

According to a further embodiment the bale engager comprises a disc extending transverse to the axis of rotation and wherein the one or more twine inserters extend from the disc parallel to the axis of rotation at a position eccentrically with respect to the axis of rotation.

In this way a simple embodiment is realized for deriving rotary motion from the completed bale during the wrapping operation.

According to a further embodiment the disc is shaped such that during a revolution around the axis of rotation there is at least one point of the disc engaging with the outer circumferential surface of the completed bale.

In this way rotary motion is reliably derived while potentially reducing the impact on the consistency of the bale, for example when using a star shaped disc of which only the arms partially project into the bale, thereby reducing the risk of forming a groove.

According to a further embodiment the disc during the extracted trajectory portion extends between twine inserter and the outer circumferential surface, thereby forming a guide configured to position the one or more twines in between the twine inserter and the outer circumferential surface.

In this way the disc forms a guide or stop that reliably positions the twine in between the twine inserter and the outer circumferential surface.

According to a further embodiment the twine inserter is positioned in a predetermined circumferential wrap zone of the outer circumferential surface of the completed bale, for example the predetermined circumferential end wrap zone, and the disc is positioned in between the predetermined circumferential wrap zone and a proximate side face of the completed bale.

In this way the twine can easily reach the zone in which the twine inserter operates, for example during the end wrap phase of the wrapping operation, while the disc prevents movement of the twine beyond this relevant zone, so that a reliable intermittent introduction of the twine can be assured in a simple way.

According to a further embodiment the movement trajectory is configured such that, during a wrapping operation, the ratio of the distance of circumferential surface covered by the one or more twines during the extracted trajectory portion with respect to the distance covered during the movement trajectory is larger than 50%, preferably larger than 80%.

In this way detectability of the twine is maximized while the impact on the consistency of the bale is minimized.

According to a further embodiment the radial insertion distance is smaller than the thickness of a crop layer of the completed bale.

In this way detectability of the twine is maximized while the impact on the consistency of the bale is minimized.

There is further provided a bale wrapping assembly according to the second aspect of the invention, or any of its embodiments mentioned above, configured to operate according to the method according to the first aspect of the invention.

BRIEF DESCRIPTION OF THE DRAWINGS

Exemplary embodiments will now be described in further detail with reference to the accompanying drawings, in which:

FIG. 1 shows an exemplary embodiment of an agricultural round baler comprising a bale wrapping assembly according to the invention;

FIG. 2 schematically shows the different phases of a bale forming operation;

DETAILED DESCRIPTION OF PREFERRED EMBODIMENTS

Figure 4:
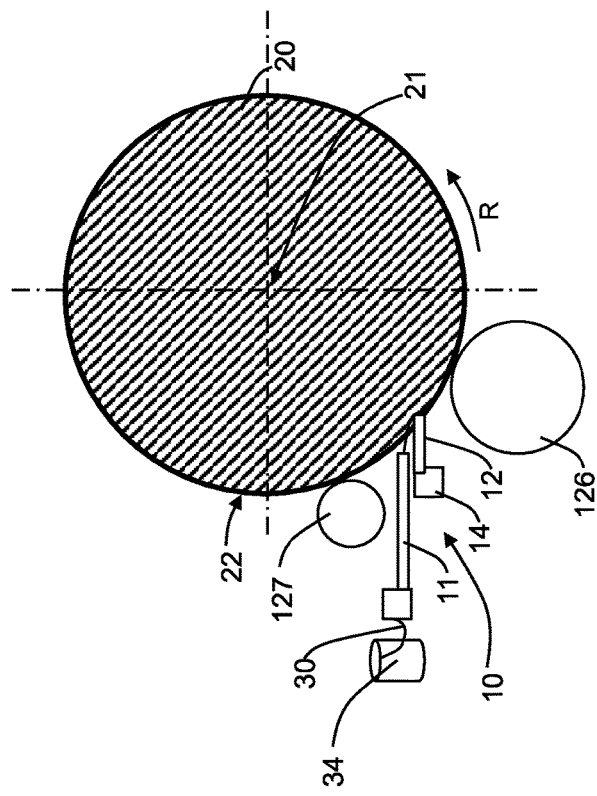
FIGS. 3 and 4 show the bale wrapping assembly of the embodiment of FIG. 1, during different phases of a movement trajectory of the twine inserter 12.

FIG. 1 schematically shows an embodiment of an agricultural round baler 1, which, when performing a baling operation, is pulled by an agricultural tractor (not shown) along a windrow of cut crop material while generally moving along a movement direction D. Round baler 1 for this purpose comprises a tongue 118 extending from the forward portion of main frame 114 for conventional connection to an agricultural tractor. The embodiment of the round baler 1 shown in FIG. 1, is generally referred to as a fixed chamber round baler 1 having a wrapping assembly 10 for wrapping the outer circumferential surface 22 of a completed bale 20 formed in the round baler 1. More particularly, the bale wrapping assembly 10 of the baler 1 is of the type, which is generally referred to as a twine wrapping assembly, and which is configured to wrap one or more twines around the outer circumferential surface 22 of the completed bale 20 as will be explained in further detail below. It is clear that although the embodiment shown in FIG. 1 shows a fixed chamber round baler, the wrapping assembly 10 and its method of operation are generally also applicable to any other type of round baler such as for example variable chamber round balers, round balers comprising a belt type bale engaging systems, roller type bale engaging systems, chain type bale engaging systems, etc. or any suitable combination of such types of bale chambers and/or bale engaging systems.

As shown in FIG. 1, the round baler 1 includes a main frame 114 with a main support beam 115 to which a pair of wheels 116 (only one shown) are rotatably attached. The main frame 114 includes a pair of side walls between which at least a part of a generally cylindrical bale forming chamber 110 extends, of which one side wall 117 is shown in FIG. 1. The elements mounted inwardly thereof are schematically shown in full lines for clarity. As further schematically shown in FIG. 1, the bale forming chamber 110, comprises a completed bale 20 shown in cross section with a generally corresponding cylindrical shape to that of the bale forming chamber 110.

Round baler 1 comprises a tailgate 121 that is pivotally connected to the sidewalls of main frame 114 by a pair of stub shafts 120. As generally known the tailgate 121 is positioned an a closed state as shown in FIG. 1 until the bale formation operation and the bale wrapping operation is completed upon which the tailgate 121 is pivoted to an open position about stub shafts 120 to discharge the wrapped completed bale. The tailgate 121 includes tailgate walls 122 which are generally aligned with the side walls 117. As shown, the side walls of the generally cylindrical bale forming chamber 110 are thus being formed by means of these tailgate walls 122 and these side walls 117.

Further, there is shown a pickup assembly 123 mounted on the main frame 114. This pickup assembly 123 comprises a plurality of fingers or tines 124 suitably rotated along a crop flow path CP to lift crop material from the ground and deliver it towards a transverse inlet 125 to the bale forming chamber 110 in between a floor roll 126 and a transverse stripper roll 127, both of which rolls 126, 127 are rotatably supported on main frame 114 between sidewalls 117.

As shown, the circumferential surface of the cylindrical bale forming chamber 110, which generally corresponds to the outer circumferential surface 22 of a completed bale 20, is defined by an apron assembly 128 comprising a pair of support chains 130 mounted to travel along a continuous path P, the inner run 131 of which defines the cylindrical circumferential surface of the bale forming chamber 110, generally transverse to the plane of the sidewalls 117 and tailgate walls 122. The apron assembly 128 further comprises a plurality of parallel tubular crop engagers 133, such as for example slats, tubes, bars, . . . , extending between chains 130 to provide a cage-like periphery of the cylindrically shaped bale forming chamber 110. Radially outward of the inner run 131 of apron assembly 128 are front and rear sections 134, 135 of apron guide wall. These sections 134, 135 of the apron guide wall are separable such that during a bale discharge operation the rear section 135, which is mounted to the tailgate walls 122, can pivot together with the tailgate 121 with respect to the front section 134, which is mounted between the side walls 117. As generally known the apron guide wall 134, 135 functions as a guide for the apron assembly 128 such that integrity is maintained between the outer run and the inner run 131 of support chains 130.

The apron assembly 128 can be driven along its continuous path P such that the inner run 131 imparts a rotary motion R to the completed bale 20 around a rotation axis generally transverse to the sidewalls 117 and the tailgate walls 122 by means of a drive sprocket 136 and idler sprockets 137, 138. As shown, a conventional chain drive system could be provided for drive sprocket 136 via an appropriate coupling to gearbox 140, for example by means of a suitable belt, chain, etc. The gearbox 140 could be driven by means of a suitable coupling to a power take off or PTO of an agricultural tractor.

The bale forming chamber 110 is further circumscribed by the conveying surfaces of floor roll 126 and stripper roll 127 both extending transversely between both sidewalls 117 and capable of being rotatably driven, by means of conventional drive means such as for example belts, chains, etc., coupled to the gearbox 140, in order to impart a rotary motion R to the completed bale 20. The floor roll 126 and/or the stripper roll 127 may be provided with ribs 141, 142 or any other suitable form of surface structure to provide a suitable engagement with crop conveyed in the bale forming chamber 110 during the bale formation operation.

As schematically shown in FIG. 1, there is provided a bale wrapping assembly 10 for dispensing one or more twines 30 from a respective twine source 34. Although only one twine source 34 and corresponding twine 30 is schematically shown in FIG. 1, the bale wrapping assembly 10 could be suited to dispense any suitable plurality of twines 30, such as for example two, three, four, etc., concurrently during a wrapping operation. As schematically shown, the bale wrapping assembly 10 comprises a twine dispenser 11 that is configured to dispense the one or more twines 30 in the vicinity of the outer circumferential surface 22 of the completed bale 20 during a wrapping operation. Such a twine dispenser 11 could for example be similar to the one disclosed in U.S. Pat. No. 8,333,146 comprising for example two twine arms or tubes which are configured to dispense two twines in the vicinity of the transverse inlet 125 of the bale forming chamber 110 between the stripper roll 127 and the floor roll 126 during a wrapping operation. These twine arms being moveable relative to the side walls of the completed bale 20 during a wrapping operation by means of a suitable drive system controlled by means of a suitably programmed controller, such that when combined with a rotary motion of the completed bale 20, the twines can be dispensed in the form of wraps 31 onto the outer circumferential surface 22 of the completed bale 20 according to a desired twine wrapping pattern, as generally known to a person skilled in the art. As will be explained in further detail below, the bale wrapping assembly 10 further also comprises at least one twine inserter 12 coupled to a drive 14 configured such that it drives the twine inserter 12 to intermittently introduce the twines 30, which are positioned at the twine inserter 12, into the outer circumferential surface 22 of the completed bale 20. It is clear that the bale wrapping assembly 10 could comprise other suitable elements such as for example a twine cutting assembly for severing the twine dispensed onto the outer circumferential surface 22 of the completed bale 20 from the twine still present in the twine dispenser 11 at the end of the wrapping operation in a suitable way generally known to the man skilled in the art, for example from U.S. Pat. No. 8,333,146.

In general the bale forming operation 200 is initiated by a bale forming step 202 in which the round baler 1 is traveled along a windrow taking in crop through the inlet 125 to the bale forming chamber 110 in which the crop is circulated along the direction R shown in FIG. 1 thereby forming a cylindrical bale of which the outer circumferential surface keeps growing until a desired completed bale 20 is formed in the bale forming chamber 110, upon which infeed of new crop material is stopped, for example by halting the tractor pulling the round baler 1. Now the wrapping operation 210 is initiated. During the wrapping operation 210 one or more twines 30 are applied to the outer circumferential surface of the completed bale by means of a bale wrapping assembly 10 which brings the one or more twines 30 in contact with this outer circumferential surface 22 of the completed bale 20 while it is still being rotated inside the bale forming chamber 110 along the direction R as shown in FIG. 1. It is known to a person skilled in the art, to apply a desired amount of wraps of the one or more twines in accordance with a desired pattern, by means of a suitable controller connected to the bale wrapping assembly 10. For the purpose of describing the invention the bale wrapping operation 210, as shown in FIG. 2, comprises an end wrap phase 212 during which end wraps are applied. These end wraps comprise the final wraps of the one or more twines, which thus means that the end wraps comprise the final share of the length of the one or more twines 30 that are wrapped around the outer circumferential surface 22 of the completed bale 20. The end wrap phase 212 ends after a twine cutting operation in which the one or more twines wrapped around the outer circumferential surface of the completed bale are severed from the respective twine source 34. During the wrap phase 214 of the wrapping operation preceding the end wrap phase 212 the one or more twines could be applied according to any desired wrapping pattern as generally known to the man skilled in the art comprising any suitable combination of helical and/or circular wraps at any desired location on the outer circumferential surface 22 of the completed bale. As further shown, this wrap phase 214 is preceded by an initial wrap phase 213 during which the twine is initially brought into contact with the outer circumferential surface of the completed bale by means of the twine dispenser 11 and subsequently initial wraps are applied. These initial wraps comprise the first wraps of the one or more twines, which thus means that the initial wraps comprise the first share of the length of the one or more twines that are wrapped around the outer circumferential surface 22 of the completed bale 20. Once the wrapping operation 210 is completed, often the rotation of the wrapped completed bale 20 is stopped, the tailgate 121 is opened and the wrapped completed bale 20 is ejected from the bale forming chamber 110 onto the ground during the discharge phase 204, upon which a new bale forming operation 200 is initiated by again pulling the round baler 1 along crop material. It is clear that alternative embodiments of the wrapping operation 210 to that shown in FIG. 2 are possible, such alternative wrapping operation 210 comprising one or more wrap phases during which wraps of the one or more twines are wrapped around the outer circumferential surface 22 of the completed bale 20. These wraps thus respectively comprising a share of the length of the one or more twines that are wrapped around the outer circumferential surface 22 of the completed bale 20.

As explained above, in order to avoid problems with the final end of the one or more twines during subsequent handling operations and feeding operations, it is important that the length of twine applied during this end wrap phase 212 is sufficiently secured to the completed bale and still remains easily retrievable in order to avoid this end of twine ending up with the crop during a feeding operation.

Figure 6:
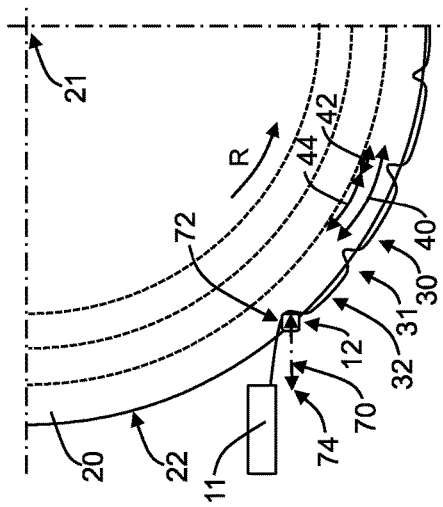
FIG. 6 shows an enlarged section of the embodiment of FIG. 4.
Figure 3:
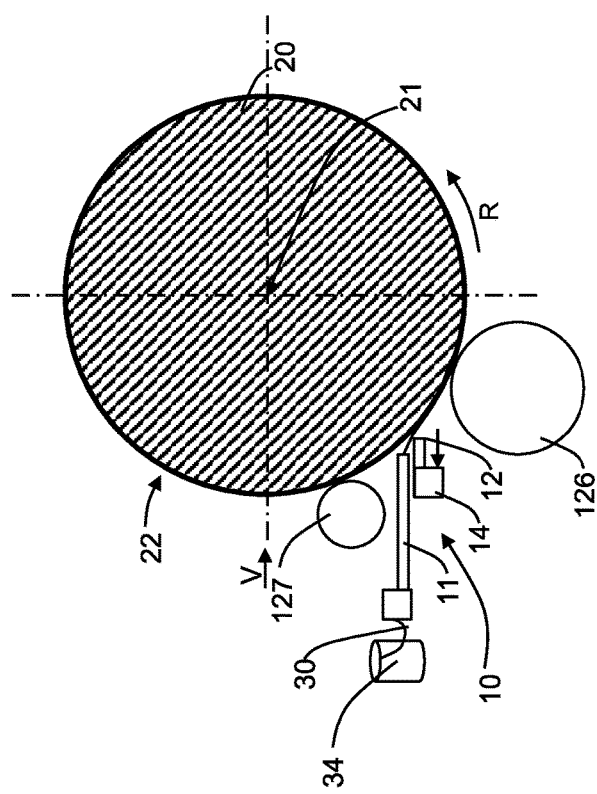

FIGS. 3 and 4 show the bale wrapping assembly 10 of the embodiment of FIG. 1, during different positions of a movement trajectory 70 of the twine inserter 12 during a wrapping operation. FIG. 6 shows an enlarged section of FIG. 4 and shows the movement trajectory more clearly. FIG. 3 shows the twine inserter 12 positioned in an extracted position that is part of an extracted trajectory portion 74 of the movement trajectory 70. During this extracted trajectory portion 74 the twine inserter 12 is positioned by the drive 14 outwardly of the outer circumferential surface 22 of the completed bale 20 at a radial distance that allows for the twine 30 to be positioned in between the twine inserter 12 and the outer circumferential surface 22. FIG. 4 shows the twine inserter 12 in an inserted position that is part of an inserted trajectory portion 72. During this inserted trajectory portion 72 the twine inserter 12 is positioned by the drive 14 inwardly, through the outer circumferential surface 22, into the completed bale 20. As shown, the twine inserter 12 thereby inserts any twines 30 then positioned in between the twine inserter 12 and the outer circumferential surface 22 into the completed bale 20. This thus means that the twine 30 is inserted over a radial insertion distance from the outer circumferential surface 22 into the completed bale 20 at the location of the twine inserter 12. This radial insertion distance is preferably chosen to be large enough to ensure sufficient engagement of the twine within the completed bale, while kept small enough to reduce the impact on the crop layers of the completed bale and to facilitate subsequent removal of the twine. The radial insertion distance is for example chosen to be smaller than the thickness of a single crop layer of the completed bale 20. According to a particular embodiment, the drive 14 of the twine inserter 12 could for example provide a reciprocating movement trajectory 70 to the twine inserter 12, during which it cycles between the extracted position and the inserted position shown in FIGS. 3 and 4. However alternative movement trajectories 70 are possible, such as for example explained below with reference to the embodiment of FIGS. 7-9, as long as in general the drive 14 is configured to provide a movement trajectory 70 to the twine inserter 12 which intersects with the outer circumferential surface 22 of the completed bale 20 and in this way comprises an extracted trajectory portion 74 and inserted trajectory portion 72.

Figure 5:
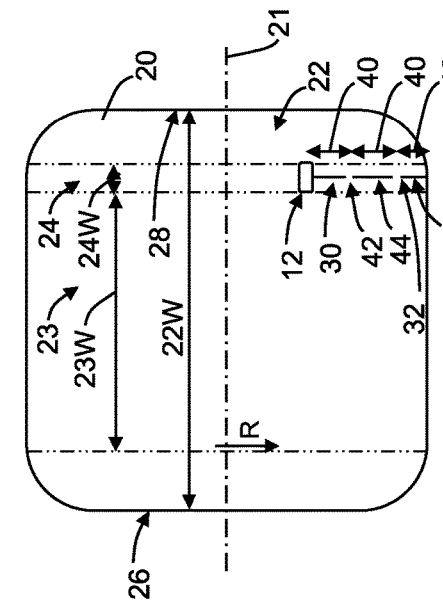
FIG. 5, shows a simplified view of the embodiment of FIGS. 3 and 4 along the direction indicated with arrow V.

It is clear, as shown in FIG. 5, which shows a simplified view of the embodiment of FIGS. 3 and 4 along the direction indicated with arrow V in FIG. 3, that when the drive 14 drives the twine inserter 12 to cyclically repeat this movement trajectory 70 a plurality of times, any of the twines 30 which are positioned at the twine inserter 12 will be intermittently introduced into the outer circumferential surface 22 of the completed bale 20 during a plurality of twine introduction cycles 40, which are also more clearly shown in FIG. 6. Each twine introduction cycle 40 thus corresponding to a cycle of the movement trajectory 70 of the twine inserters 12. As shown, each twine introduction cycle 40 comprises an insertion phase 42 during which the one or more twines 30 are introduced into the outer circumferential surface 22 of the completed bale 20 by the bale wrapping assembly 10. According to this embodiment, this means that while the completed bale 20 rotates around its rotation axis 21 along direction R past the twine inserter 12, the twine 30 dispensed by the twine dispenser 11 onto the outer circumferential surface 22 of the bale 20, that passes between the twine inserter 12 and the outer circumferential surface 22 of the completed bale, is inserted through the outer circumferential surface 22 into the completed bale 20 by moving the twine inserter 12 from an extracted position of the extracted trajectory portion 74 to an inserted position of the inserted trajectory portion 72 as shown in FIGS. 4 and 6. As further shown, each twine introduction cycle 40 also comprises a surface phase 44 during which the twines 30 positioned at the twine inserter 12 are not introduced into the outer circumferential surface 22 of the completed bale 20 by the bale wrapping assembly 10. According to this embodiment, this means that completed bale 20 continues rotating along the direction R past the twine inserter, and that the twine 30 dispensed by the twine dispenser 11 onto the outer circumferential surface 22 of the completed bale 20, is allowed to freely pass in between the twine inserter 12 and the outer circumferential surface 22 of the completed bale 20 by moving the twine inserter 12 along its movement trajectory 70 from an inserted position of the inserted trajectory portion 72 back to an extracted position of the extracted trajectory portion 74. As shown, it is clear that the length of twine 30 covered by each introduction cycle 40 is smaller than the length of twine needed for a wrap of twine covering one revolution of the outer circumference 22 of the completed bale 20 which could for example be 4 m or more, while the length of twine covering each introduction cycle 40 covers for example 40 cm or less.

As shown in FIG. 6, preferably the distance of the outer circumferential surface 22 covered by the twine 30 during the surface phase 44 is larger than the distance covered during the insertion phase 42, as in this way the twine 30 remains easily accessible and the risk of inadvertent disposal of twine during a feeding operation is reduced. Preferably the ratio of the distance of the outer circumferential surface 22 covered by the one or more twines 30 during the surface phase 44 with respect to the distance covered during the introduction cycle 40 is larger than 50%, preferably larger than 80%. For example for an introduction cycle 40 covering a distance of 40 cm of the circumferential surface, the insertion phase 42 covers only a distance of 4 cm or less. It is clear that by modifying the frequency with which the twine inserter 12 cycles through the movement trajectory 70 and/or the ratio of the inserted trajectory portion 72 versus the extracted trajectory portion 74, and taking into account the rotational speed of the outer circumferential surface of the completed bale, the distance of the circumferential surface 22 covered by the one or more twines 30 during each of these trajectory portions, and/or the ratio of these respective distances, can be suitably adjusted, for example by means of a suitable control system connected to the drive 14 of the twine inserter 12.

As known to the man skilled in the art, during the wrapping operation one or more twines 30 are wrapped according to a desired wrapping pattern at changing locations across the width 22W of the outer circumferential surface 22 of the completed bale 20 extending between both opposing side faces 26, 28 of the completed bale 20 as shown in FIG. 5. The embodiment shown, refers to a wrapping operation 210 providing a wrapping pattern similar as that known from U.S. Pat. No. 8,333,146 or US2008/0034984 during which twine 30 is applied according to a desired pattern during a plurality of wrap phases during which wraps 31 of the twines 30 are wrapped around the outer circumferential surface 22 of the completed bale 20. According to the embodiment shown in FIGS. 3 to 5, the wraps 31 applied during the wrap phases 213 and 214, which precede the end wrap phase 212 as explained with reference to FIG. 2, are applied in a predetermined circumferential wrapping zone 23. The wraps 31 applied during the subsequent end wrap phase 212, also referred to as the end wraps 32, are wrapped around a predetermined circumferential end wrap zone 24 of the outer circumferential surface 22 of the completed bale 20. As already explained above during this end wrap phase 212 end wraps 32 are applied, which are wraps 31 that comprise the final share of the length of twine 30 wrapped around the outer circumferential surface 22 of the completed bale 20. As shown in FIG. 5, the circumferential end wrap zone 24 is a share of the width 22W of the outer circumferential surface 22 located next to the right side of the wrap zone 23 near the right side face 28 of the completed bale 20. However it is clear that according to alternative embodiments alternative arrangements of the end wrap zone 24 are possible. For example, it is know from EP0978231 to have two end wrap zones 24, one near each side face 26, 28, of the completed bale 20. It is further known to have an end wrap zone 24 centrally located with respect to the width 22W of the circumferential surface from for example EP1346627 or U.S. Pat. No. 6,035,773. It is clear that still further alternative arrangements for the end wrap zone 24 are possible in which wraps 31 in the form of end wraps 32 comprising the final length of twine are wrapped around the completed bale 20. Preferably the length of twine 30 of the end wraps 32 applied during the end wrap phase 212 is as limited as possible in order to complete the wrapping operation as fast as possible and to optimize twine consumption. However it should be long enough in order to preferably allow for two, three, four, . . . , ten, . . . , fifteen, etc. or any other suitable plurality of introduction cycles 40 in order to prevent the final lengths of twine from detaching from the outer circumferential surface 22 during subsequent handling operations.

As shown generally, the width 24W of the predetermined circumferential end wrap zone 24 is relatively small compared to the width 23W of the wrap zone 23 and the width 22W of the circumferential surface 22 of the completed bale 20. Usually it is smaller than 5% of the width 22W of the circumferential surface 22 of the completed bale, preferably smaller than 3%. In this way, according to a preferred embodiment, as shown in FIG. 5, in which the bale wrapping assembly 10 only intermittently introduces the twine 30 into the outer circumferential surface 22 of the completed bale 20 during this end wrap phase 212, this can be accomplished by means of a bale wrapping assembly 10 comprising a twine inserter 12 that only needs to extend across the width 24W of the predetermined circumferential end wrap zone 24. This is preferred as the outer circumferential surface 22 is then only affected in this limited circumferential end wrap zone 24 by the twine inserter 12 which cyclically pierces the outer circumferential surface 22 during the inserted trajectory portion 72 of its movement trajectory 70. Additionally this allows the twine inserter 12 to be located at a predetermined location with respect to the width 22W of the completed bale 20, for example by means of a suitable connection with one of the side walls or the frame of the baler. Still further this location is conventionally only reached by the twine dispensers 11 at the end of the wrapping operation in order to cooperate with a twine cutting assembly, which allows the twine inserter 12 to be arranged in a way that does not interfere with the range of movement of the twine dispenser 11 across the width 23W of the wrap zone 23 during the preceding phases 213, 214 of the wrapping operation 210 for applying corresponding wraps 31 of twine 30 according to any variety of a desired wrapping pattern.

Although it is preferred to only intermittently introduce twine 30 into the outer circumferential surface 22 of the completed bale 20 during this end wrap phase 212 as described above, it is clear that according to alternative embodiments optionally twine could also be intermittently introduced into the outer circumferential surface 22 of the completed bale 20 during other wrap phases of the wrapping operation 210. It could for example be beneficial to intermittently introduce the wraps 31 of the twines 30 applied during the initial wrap phase 213 of the wrapping operation 210 in order to improve engagement of the first ends of twine 30 dispensed from the twine dispensers 11 with the outer circumferential surface 22 of the completed bale 20. Often, similar as the end wraps 32, these initial wraps applied during the initial wrap phase 213 are wrapped around a predetermined circumferential wrap zone of the outer circumferential surface 22 of the completed bale 20 of which the width is relatively small compared to the width 22W of the circumferential surface 22 of the completed bale 20. The twine dispensers 11 are often moved to a predetermined starting location in which they bring the twine ends into contact with the outer circumferential surface of the completed bale. The twine dispensers 11 then remain in this position during the initial wrap phase until it is detected that initial wraps comprising a sufficient share of twine has been applied to the completed bale in order to ensure a reliable engagement of the twine with the completed bale in the bale forming chamber, before the wrapping operation continues with subsequent wrapping phases during which the twine is moved away from this starting position in order to apply a desired pattern along the width of the outer circumferential surface 22. In order to improve the reliability of the engagement of the initial wraps or in order to reduce the length of twine comprised in these initial wraps, similar as explained above, the bale wrapping assembly 10 could intermittently introduce these initial wraps into the outer circumferential surface 22 of the completed bale 20 when present in this predetermined circumferential wrap zone. This could for example be realized by arranging a twine inserter 12 at the location of this predetermined circumferential wrap zone where these initial wraps of twine are applied. It is clear that still further embodiments are possible as long as in general the bale wrapping assembly 10 during at least a part of the wrapping operation 210 intermittently introduces one or more twines 30 into the outer circumferential surface 22 of a completed bale 20. This thus means that the bale wrapping assembly 10 during at least one of the wrap phases 212, 213, 214 intermittently introduces the wraps 31 applied during this respective wrap phase into the outer circumferential surface 22 of the completed bale 20. This could for example be realized by attaching the twine inserter 12 and its drive 14 to the moveable end of the twine dispensers 11 and suitably actuating the drive 14 during the phases of the wrapping operation in which the intermittent introduction of twine 30 is desired. Alternatively, when during at least one of the wrap phases the wraps are wrapped around a predetermined circumferential wrap zone of the outer circumferential surface of the completed bale, there could be arranged a suitable plurality of twine inserters 12 at locations with respect to the width of the completed bale where an intermittent introduction of the twine 30 is desired, or by extending the twine inserter 12 along the areas across the width of the completed bale where an intermittent introduction of the twine 30 is desired. In this way the bale wrapping assembly 10 intermittently introduces the corresponding wraps 31 into the outer circumferential surface 22 of the completed bale 20 when present in this predetermined circumferential wrap zone 24.

Although the embodiment of FIGS. 3 to 6 have been described in function of simplicity with reference to a twine inserter 12 which is provided with a reciprocating movement trajectory by a suitable drive 14, which could comprise in a suitable way a pneumatic or hydraulic cylinder or a suitable mechanical drive system capable of providing a reciprocating motion to the twine inserter 12, it is clear that alternative embodiments are possible as long as in general the bale wrapping assembly 10 comprises one or more twine inserters 12, each coupled to a drive 14 configured such that it drives the twine inserter 12 to intermittently introduce one or more of the twines 30, which are positioned at the twine inserter 12, into the outer circumferential surface 22 of the completed bale 20.

Although the embodiments of FIGS. 1-6 show the twine dispenser 11 and the twine inserter 12 of the bale wrapping assembly 10 being both arranged next to the outer circumferential surface of the completed bale in between the stripper roll 127 and the floor roll 126, at the inlet 125 of the bale forming chamber 110, it is clear that according to alternative embodiments the bale wrapping assembly could be suitably arranged at alternative locations. The twine dispensers 11, could for example be arranged to introduce the twines in between the stripper roll 127 and the apron assembly 128, such as for example known from EP0978231, or any other suitable location upstream of the twine inserter 12 with respect to the direction of rotation R of the completed bale 20 around its axis of rotation 21. Both the twine dispenser 11 and the twine inserter 12 could be located at another suitable location with respect to the specific belt or roll assemblies or any combination thereof as in general use in fixed or variable chamber types of round balers 1 such as for example known from US2008/0034984, EP0980646, EP0858734, EP1346627, etc. as long as in general the twine inserter 12 is configured to engage the twine 30 at a location on the outer circumferential surface 22 of the completed bale 20 at or downstream of the location where the twine 30 was dispensed on the outer circumferential surface 22 by the twine dispensers 11, this means downstream with respect to the direction of rotation R of the completed bale 20 around its axis of rotation 21.

Figure 7:
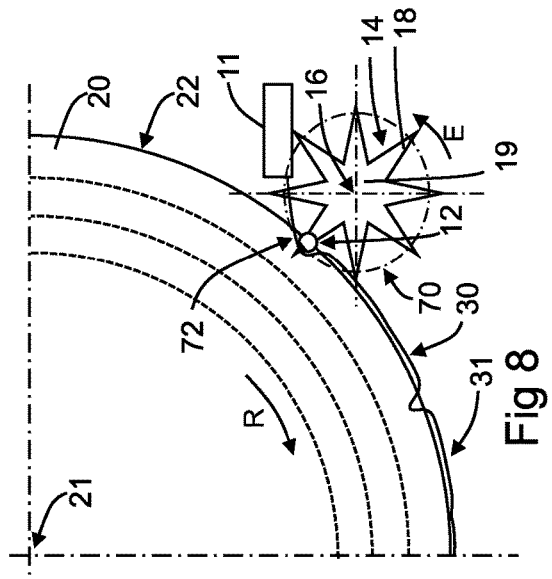
FIG. 7 is a view similar to FIG. 5 of an alternative embodiment of the wrapping assembly.
Figure 8:
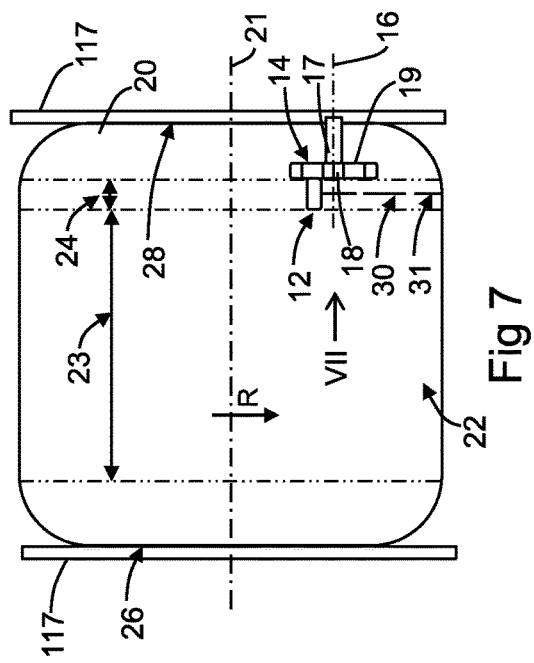
FIGS. 8 and 9 show a view similar to that of FIG. 6, for the embodiment of FIG. 7, during different phases of the movement trajectory of the twine inserter.
Figure 10:
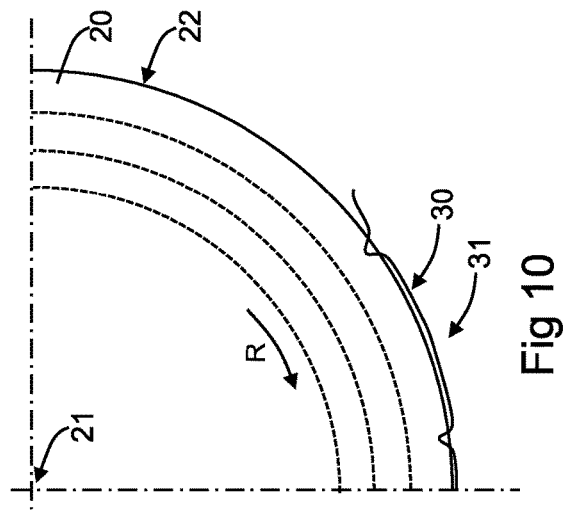
FIG. 10 schematically shows a completed bale after completion of the wrapping operation according to the method shown in FIGS. 3 to 9.
Figure 9:
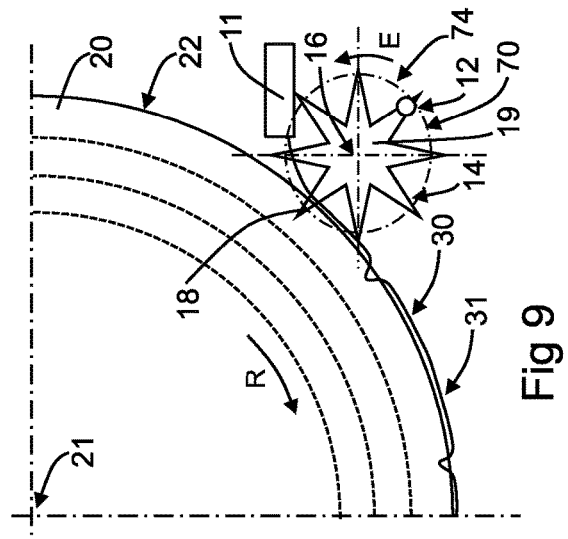

A particularly simple and advantageous alternative embodiment of the bale wrapping assembly 10 is shown in FIGS. 7 to 9. As shown in FIG. 7, which is a view similar to that of FIG. 5, the twine inserter 12 is also positioned in the predetermined circumferential end wrap zone 24. However, now, instead of a reciprocating drive 14, there is provided a disc 19 that is positioned in between the predetermined circumferential end wrap zone 24 and the proximate side face 28 of the completed bale 20. As more clearly shown in FIGS. 8 and 9 this disc 19 is rotatably attached to the proximate side wall 117, for example by means of a suitable shaft, and extends transverse to an axis of rotation 16 parallel to the axis of rotation 21 of the completed bale 20. The twine inserter 12 extends from this disc 19 parallel to this axis of rotation 16 and at a position eccentrically with respect to this axis of rotation 16. This means that the twine inserter 12 is a slat, shaft, pin, or any other suitable element generally extending along the direction of the width of the completed bale 20 from the disc 19 that is generally parallel to the side faces 26, 28 of the completed bale 20.

As shown the drive 14 thereby provides a circular movement trajectory 70 to the twine inserter 12 which intersects with the outer circumferential surface 22 of the completed bale 20. As shown, the distance from the twine inserter 12 to the axis of rotation 16, which forms the radius of the circular movement trajectory 70, is larger than the distance from the outer circumferential surface 22 of the completed bale 20 to the axis of rotation 16. Thereby, the outer circumferential surface 22 of the completed bale divides the circular movement trajectory 70 in a first circle segment protruding into the completed bale 20 and a second circle segment extending out of the completed bale 20. This first circle segment thereby forming the inserted trajectory portion 72 and this second circle segment thereby forming the extracted trajectory portion 74 of the movement trajectory 70. As already mentioned above it is preferred to limit the radial insertion distance of the twine inserter 12 into the completed bale. It is clear that according to this embodiment the insertion distance can be controlled by choosing the ratio between the radius of the circular movement trajectory 70 and the distance from the outer circumferential surface 22 of the completed bale 20 to the axis of rotation 16. This ratio will also largely determine the ratio of the first circle segment and the second circle segment of the circular movement trajectory. This ratio is preferably chosen such that the distance of circumferential surface 22 covered by the one or more twines 30 during the extracted trajectory portion 74, formed by the second circle segment, is larger than 50%, preferably larger than 80% of the distance of the twine 30 covered during the entire movement trajectory 70. This can be accomplished by for example choosing the second circle segment to be larger than 50%, preferably larger than 80% of the entire circular movement trajectory 70.

As further visible, the disc 19 is star shaped and arranged in proximity of the outer circumferential surface 22 of the completed bale 20 in such a way that the disc 19 during a revolution around its axis of rotation 16 engages with the outer circumferential surface 22 of the completed bale 20 with at least one point of the disc 19. Such a star shaped or any suitable alternative shape of the disc 19 which minimizes the area affected by the parts of the disc 19 projecting into the outer circumferential surface 22 of the completed bale 20 is preferred as in this way the impact of the engagement of the disc 19 on the outer circumferential surface 22 is minimized, which reduces the risk of the formation of grooves that impact the consistency of the completed bale 20. As shown, preferably the disc 19 does not protrude deeper into the completed bale 20 than a single crop layer as schematically indicated with the striped lines for the same reason. As shown, according to this embodiment, the twine inserter 12, projects from one of the arms of the star-shaped disc 19.

In this way the disc 19 forms a drive 14 for the twine inserter 12 as it functions as a bale engager 18 that contacts the outer circumferential surface 22 of the completed bale 20 such that a rotary motion of the drive 14 around the axis of rotation 16 is imparted by the rotary motion of the completed bale 20 during the wrapping operation. It is clear that alternative embodiments of such a drive 14, which in general eccentrically rotates the twine inserter 12 around the axis of rotation 16 parallel to the axis of rotation 21 of the completed bale 20 are possible. Such drives 14 could for example be formed by a suitable disc 19 driven by a suitable rotary drive system. This disc 19 being shaped and positioned such that it doesn't contact the completed bale 20 and comprises a radial extension forming the twine inserter 12 of which the movement trajectory does intersect with the outer circumferential surface of the completed bale 20.

FIG. 8 shows the disc 19 during the insertion phase 42 in which it projects the twine inserter 12 into the completed bale 20, thereby also introducing the twine 30, which was located in between the twine inserter 12 and the outer circumferential surface 22, into the completed bale 20 over a radial insertion distance. The twine inserter 12 in this way thus being positioned in an inserted position of the inserted trajectory portion 72. FIG. 9 shows the disc 19 during the surface phase 44, after a rotary movement along the direction of rotation E around its axis of rotation 16, imparted by the rotary movement of the completed bale 20 along the direction of rotation R around its axis of rotation 21 during the wrapping operation. During this surface phase 44 the twine inserter 12 is rotated along its circular movement trajectory 70 to an extracted position of the extracted trajectory portion 74 at a radial distance of the outer circumferential surface 22. However, as clearly shown, preferably, the disc 19 is shaped such that even in this extracted trajectory portion 74 during the surface phase 44, it extends between twine inserter 12 and the outer circumferential surface 22. In this way the disc 19 forms a guide or stop that reliably positions the twine 30 in between the twine inserter 12 and the outer circumferential surface 22. It is clear that in this way advantageously the twine can be moved by the twine dispensers 11 from the wrap zone 23 to the end wrap zone 24 during the wrapping operation without any elements hindering the introduction of the twine 30 into the end wrap zone 24, while the star shaped arms of the disc 19 act as a guide or stop which prevent the twine from traveling further beyond the end wrap zone 24 in which the twine inserter 12 operates.

It is clear that further alternative embodiments are possible, especially with respect to the shape of the disc 19 or the twine inserter 12 or their respective arrangement. The twine inserter 12 could for example be embodied as a separate element projecting radially from a rotating shaft connected to disc 19, both at a different position with respect to the width of the completed bale 20. Although not preferred, in such a case even a circular shape for the disc 19 could be considered. In such a case the groove that would be created by such a circular bale engager 18 should be positioned at a sufficient distance, along the width direction of the completed bale, from the twine applied to the completed bale during a wrapping operation. This then reduces the risk that the twine inserter 12 would insert this twine into this groove.

It is further clear that still further alternative embodiments of the movement trajectory 70 are possible, which for example impart a cyclical rotary or reciprocating or any other suitable motion to the twine inserter 12. Preferably, the ratio of the distance of circumferential surface 22 covered by the one or more twines 30 during the extracted trajectory portion 74 with respect to the distance of the twine 30 covered during the entire movement trajectory 70 is larger than 50%, preferably larger than 80%. In this way the portion of the twine that is visible and accessible on the outer circumferential surface is sufficiently large, which reduces the risk of undetected twine portions. Additionally this facilitates removal of the intermittently introduced wraps, for example in preparation of a subsequent feeding operation as the share of the twine which is introduced into the bale and which is subjected to a larger amount of friction during such a removal operation is limited. According to a preferred embodiment in which for example only the end wraps and/or initial wraps are subjected to intermittent introduction into the bale, it is clear that this still further facilitates the removal operation as only the final ends of the twine wrapped around the bale are subjected to higher frictional forces. Such a removal operation can for example be initiated by cutting loose the wraps of the twine which are not intermittently introduced into the bale. Subsequently the intermittently introduced end wraps or initial wraps, which will be attached to some of these cut wraps as their final end, can be easily removed by pulling these cut wraps as, although friction is sufficiently increased to prevent release of the end wraps or initial wraps as a result of the combined frictional forces of all inserted parts of twine during a plurality of introduction cycles, sequentially releasing each of these inserted parts during such a removal operation as a result of pulling the twine will still remain relatively easy as the individual frictional force created by each of the inserted parts of twine individually remains more limited. It is clear that these individual frictional forces are limited especially in the case where the surface phase of the introduction cycles is kept large enough as mentioned above.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A bale wrapping assembly for a round baler, comprising:
   a twine dispenser configured for introducing a twine into a bale chamber;
   at least one twine inserter, coupled to a drive, the drive configured to drive the at least one twine inserter along a movement trajectory such that a portion of the twine inserter extends intermittently into the bale chamber and contacts the dispensed twine and introduces the dispensed twine through a circumferential surface of a completed bale within the chamber to introduce one or more twines, which are positioned between the at least one twine inserter and the completed bale, wherein the twine inserter is positioned so that when activated it enters the bale chamber extending past rollers forming a portion of the bale chamber and is directly downstream from the twine dispenser with respect to the movement of inserted twine;
   wherein the drive is a linear actuator configured to displace the at least one twine inserter such that a movement trajectory of the twine inserter intersects with the outer circumferential surface of the completed bale, the movement trajectory comprising:
   an extracted trajectory portion during which the at least one twine inserter is positioned by the drive, outwardly of the outer circumferential surface of the completed bale, at a radial distance that allows for one or more of the twines to be inserted in the chamber by the twine dispenser between the at least one twine inserter and the outer circumferential surface; and
   an inserted trajectory portion during which the at least one twine inserter is moved inwardly through the outer circumferential surface into the completed bale, thereby inserting one or more of the twines, that were positioned in between the at least one twine inserter and the outer circumferential surface in the extracted trajectory portion, at a radial insertion distance from the outer circumferential surface into the completed bale at the location of the at least one twine inserter.

2. The bale wrapping assembly according to claim 1, wherein a control system is connected to the drive and is configured to modify the drive frequency with which the at least one twine inserter cycles through the movement trajectory and to modify a ratio of an inserted trajectory distance portion to an extracted trajectory distance portion, thereby adjusting a distance of the circumferential surface covered by the one or more twines during at least one of each of the inserted trajectory distance portion and the extracted trajectory distance portion at a rotation speed of an outer circumferential surface of the completed bale.

3. The bale wrapping assembly according to claim 2, wherein the drive comprises a bale engager configured to contact the outer circumferential surface of the completed bale such that a rotary motion of the drive around an axis of rotation of the drive is imparted by the rotary motion of the completed bale.

4. The bale wrapping assembly according to claim 1, wherein the drive is configured to eccentrically rotate the at least one twine inserter around an axis of rotation parallel to an axis of rotation of the completed bale, thereby providing a circular movement trajectory.

5. The bale wrapping assembly according to claim 4, wherein the twine inserter is extended beyond the external circumference of the completed bale, such that a distance from the at least one twine inserter to the axis of rotation of the completed bale, which forms the radius of the circular movement trajectory, is larger than the distance from the outer circumferential surface of the completed bale to the axis of rotation.

6. The A bale wrapping assembly according to claim 4, wherein the outer circumferential surface of the completed bale divides the circular movement trajectory in a first circle segment protruding into the completed bale and a second circle segment extending out of the completed bale, the first circle segment thereby forming the inserted trajectory portion and the second circle segment thereby forming the extracted trajectory portion wherein the insertion of the twine inserter is timed such that first circle segment is less than 50% of the second circle segment.

7. The bale wrapping assembly according to claim 1, wherein the movement trajectory is configured such that, during a wrapping operation, the ratio of the distance of circumferential surface covered by the one or more twines during the extracted trajectory portion with respect to the distance covered during the movement trajectory is larger than 50%.

8. The bale wrapping assembly according to claim 1, wherein the radial insertion distance is smaller than a thickness of a crop layer of the completed bale.

9. The bale wrapping assembly according to claim 1, wherein the drive comprises a plurality of projections that form the outer portion of the disc, the plurality of projections configured to contact the outer circumferential surface of the completed bale such that a rotary motion of the drive around an axis of rotation of the drive is imparted by the rotary motion of the completed bale.

10. A bale wrapping assembly for a round baler, comprising:
- a twine dispenser configured for introducing a twine into a bale chamber;
- at least one twine inserter, coupled to a drive, the drive configured to drive the at least one twine inserter along a movement trajectory such that a portion of the twine inserter extends intermittently into the bale chamber and contacts the dispensed twine and introduces the dispensed twine through a circumferential surface of a completed bale within the chamber to introduce one or more twines, which are positioned between the at least one twine inserter and the completed bale, wherein the twine inserter is positioned so that when activated it enters the bale chamber extending past rollers forming a portion of the bale chamber and is directly downstream from the twine dispenser with respect to the movement of inserted twine
- wherein the twine inserter comprises a disc extending transverse to the axis of rotation of the drive and wherein the at least one twine inserter laterally extends from the disc parallel to an axis of rotation of the completed bale at a position eccentrically with respect to the axis of rotation of the drive.

11. The bale wrapping assembly according to claim 10, wherein the disc has a plurality of protrusions extending radially with respect to the center of the disc, and the plurality of protrusions are spaced such that during a revolution around the axis of rotation of the drive there is at least one point of the plurality of protrusions of the disc engaging with the outer circumferential surface of the completed bale, wherein the twine inserter extends from one of the plurality of protrusions.

12. The bale wrapping assembly according to claim 11, wherein the disc during an extracted trajectory distance portion extends between the at least one twine inserter and the outer circumferential surface, thereby forming a guide configured to position the one or more twines in between the at least one twine inserter and the outer circumferential surface.

13. The bale wrapping assembly according to claim 10, wherein the at least one twine inserter is positioned in a predetermined circumferential wrap zone of the outer circumferential surface of the completed bale and the disc is positioned in between the predetermined circumferential wrap zone and a proximate side face of the completed bale.

* * * * *